United States Patent [19]

McGuire et al.

[11] 4,010,571
[45] Mar. 8, 1977

[54] AUTOMATIC LOADING DOCK

[75] Inventors: Winston B. McGuire; Charles W. Mellyn, both of Hudson, N.Y.

[73] Assignee: W. B. McGuire Co., Inc., Hudson, N.Y.

[22] Filed: Sept. 8, 1975

[21] Appl. No.: 611,240

[52] U.S. Cl. .................................. 49/70; 49/14; 49/33; 49/139; 49/263; 214/38 BA
[51] Int. Cl.² ................................... E06B 7/00
[58] Field of Search ............ 49/263, 264, 266, 33, 49/139, 70, 13, 14, 197, 199, 25; 214/38 BA

[56] References Cited

UNITED STATES PATENTS

| | | | |
|---|---|---|---|
| 2,186,311 | 1/1940 | Weathers | 49/70 X |
| 2,758,836 | 8/1956 | Purdy | 49/13 X |
| 3,578,185 | 5/1971 | Black | 49/263 X |

*Primary Examiner*—Kenneth Downey
*Attorney, Agent, or Firm*—Laff, Whitesel & Rockman

[57] ABSTRACT

A loading dock assembly adapted to be included in a building comprising an automatic control means for opening and closing the loading dock door, automatically raising and lowering the dock ramp to a proper position, as well as automatically turning on and off the dock light.

11 Claims, 9 Drawing Figures

AUTOMATIC LOADING DOCK

This invention relates to a loading dock assembly adapted to be included in a shipping room at the door to which a truck to be loaded is driven.

A normal shipping room has an outside door to which a truck to be loaded is driven, which operates either manually or automatically by a push button-operated motor and lifting mechanism. Due to non-standardization of truck bed hikes for various sizes of trucks, and various amounts of load which a truck might be bearing, the truck bed does not often line up precisely with the shipping room floor. Consequently it is desirable to have a ramp, up which a lifting vehicle or person can pass smoothly, from the shipping room dock floor to the truck bed and vice versa. Often the ramps are jarred out of position, and sometimes unenthusiastic shipping room personnel may neglect to place a ramp into position, creating a possibly hazardous situation.

It is clear that once a truck moves into position, a significant amount of labor and time must be extended in preparing the loading facilities. The driver of the truck usually must approach the shipping room door, push a button which rings a bell inside the shipping room. The shipping room door must then be opened, a dock light switched on to illuminate the interior of the truck and the dock area, and then a ramp must be placed into position between the dock floor and truck bed and adjusted so as to be as safe as possible.

After the loading procedure is complete, the ramp must be removed, the dock light switched off, and the shipping door closed.

In the present invention, almost the entire facility-preparation procedure is done automatically. Upon arrival of the truck in its loading position, an alerting light or buzzer is automatically switched on within the shipping room. An operator simply pushes a button, and the dock door opens, the dock light switches on, and the ramp extends automatically to a proper position between the dock floor and the bed of the truck. When the truck is driven away, the ramp returns to its position, the door closes, and the dock light is switched off, again, all automatically. The procedure can also be implemented manually, rather than automatically, if desired.

The inventive loading dock assembly thus is comprised of a door for closing a loading opening in a building, above a dock, and automatic control means for opening or closing the door. The control means is arranged to open the door when the bed of the truck is in a loading position, and to close the door only when the truck bed has moved away from the loading position.

A further aspect of the invention also includes the above combination further comprising an automatic dock leveler means for providing a ramp bridging the bed of a truck and the floor of the storage facility. The dock leveler is provided with control means which is actuated to raise the leveler only when the door is in an opened state.

Further objects and features of the present invention will become apparent from the following description of a preferred embodiment, with reference to the accompany drawings.

IN THE DRAWINGS

FIG. 1(a) through FIG. 1(e) are schematic side views of a part of a shipping room including certain parts of the present invention, showing the sequence of operation;

Figure 1:
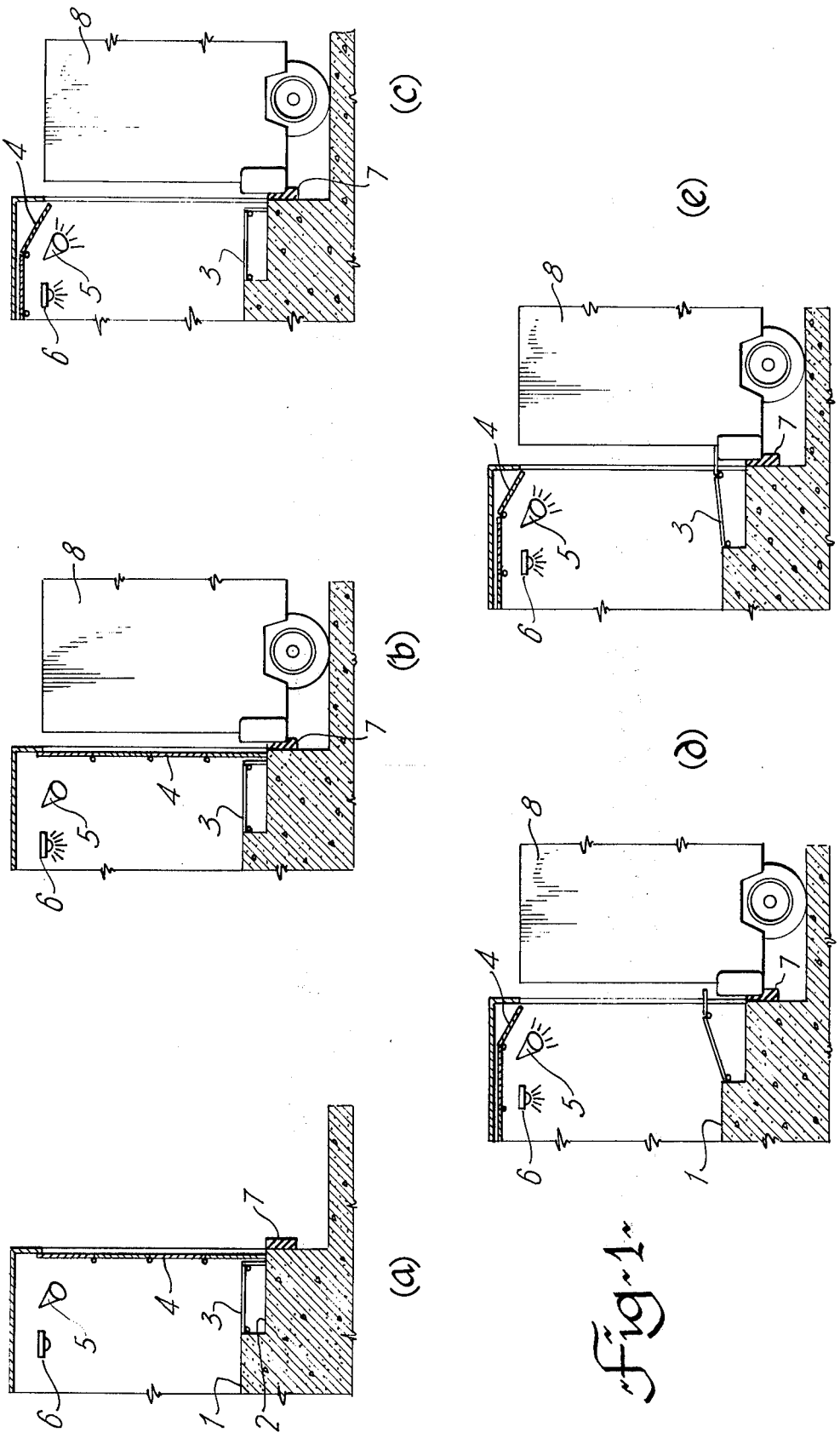

Turning firstly to FIGS. 1(a) through 1(e) and in particular to FIG. 1(a), a shipping room entrance is shown including a dock floor 1 which has a cavity 2 for receiving the mechanism of an automatic ramp 3 arranged inside the shipping room adjacent a door 4. The entrance area also comprises a dock light 5 and a signal light or buzzer 6. The outside wall of the shipping room is provided with a bumper 7 arranged for engagement with the rear edge of the truck box of a truck 8. It will be observed that the ramp 3 is provided with a lip which is pivotally secured to the front free edge of the ramp 3.

FIG. 1(a) shows the dock assembly at standstill, wherein the door 4 is closed, all remaining integers being in inoperative mode, the lip of the platform 3 being tucked in and forming support for the free edge of the ramp 3, the ramp itself is flush with the floor 1 and thus bridges the top of the cavity 202.

On arrival 1(b), a truck 8 to be loaded or unloaded (FIG. 1B), the truck 8 is backed toward the door 4 and, eventually, its rear edge engages the bumper 7 thus initiating the operation of the present invention. The engagement of truck 8 with bumper 7 actuates the light or buzzer 6 thus giving a signal to the inside operator that the truck has engaged the bumper 7.

The operator now actuates the mechanism of the door 4, whereby the door is opened (FIG. 1(c)); simultaneously, the dock light 5 is automatically switched on to provide a good visibility in the area of the entrance. It is to be noted that if a buzzer is used, it may be disengaged at this point by suitable means, although FIG. 1(c) shows the light 6 still in an actuated state.

When the door 4 is in a fully opened state (FIG. 1(d)), the mechanism of ramp 3 is automatically actuated to lift same and to extend the lip of the ramp as shown. In this state, it will be observed that the ramp 3 is inclined with the lip located above the floor of the truck 8.

The ramp 3 is then automatically lowered (FIG. 1(e)) thus bringing its lip into resting position onto the rear edge of the truck bed. The truck is now ready to be unloaded or loaded, with the ramp 3 bridging the space between the floor 1 and the bed of the truck.

When the loading or unloading operation is finished, the assembly is again actuated to operate as described above, but in a reverse order. The ramp 3 will rise and the lip become tucked in and the ramp will then move to its stowed position. The dock light 5 will shut off, and the door 4 close, effectively sealing the building from outside access. The closing sequence is thus complete.

Figure 2:
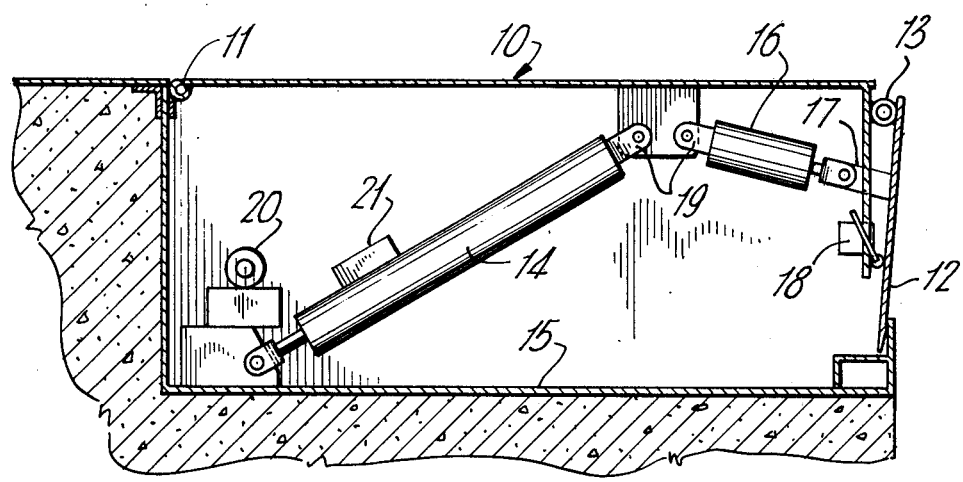
FIG. 2 is a side view detail of the mechanism of the ramp used in the present invention.

FIG. 2 shows the ramp 3 in side elevation in more detail. The ramp is comprised of platform 10, hinged along one edge by pivot 11. Along the other edge is disposed a lip 12 which is hinged by pivot 13 to platform 10. Hydraulic cylinder 14 bears between frame 15 (which is located within cavity 2) and the underside of platform 10. Hydraulic cylinder 16 is coupled between the bottom of platform 10 and the underside of lip 12, via post 17.

Bearing against the inside edge of lip 12 is a microswitch mechanism 18, which senses when the lip is in its closed position. The hydraulic cylinders are attached to the underside of the platform by means of pins through clevis 19.

Thus it may be seen that under power hydraulic cylinder 14 extends and forces upward movement of the platform 10, which rotates about pivot 11. Power is provided by means of a dock motor 20, which operates a hydraulic pump, which provides hydraulic pressure for both cylinders 14 and 16.

Mounted on hydraulic cylinder 14 is a tumbler switch 21. The tumbler switch, of well known construction, is electrically closed unless the main hydraulic cylinder 14 is at or near its maximum extended position, whereupon it opens.

During operation the hydraulic cylinder 14 will extend, raising platform 10 about its lower pivot to its maximally raised position approximately 30° from the horizontal. The hydraulic circuit is structured such that once the rod of cylinder 8 has reached full stroke, a well-known sequence valve action diverts oil to the rear end of lip cylinder 16, causing the rod to move outward. This causes rotation of lip 12 about hinge 13, resulting in an extension of the platform lip similar to that shown in FIG. 1 (d). By this time the tumbler switch 21 has opened and has cut current to dock motor 20, causing the hydraulic pump to stop. This removes power from hydraulic cylinder 14, allowing the entire assembly to lower to the position shown in FIG. 1 (e), with lip 12 resting on the truck bed.

Once it is desired to return the ramp to its rest position, power is again applied to cylinder 14, lifting it and lip 12 to its maximally raised position. Power is then cut-off by a tumbler switch 21 electrically opening. The hydraulic valving then allows hydraulic fluid to drain from hydraulic cylinder 16 and then hydraulic cylinder 14, moving lip 12 to its closed position, and lowering platform 10.

It should be noted that when lip 12 is in its closed position, microswitch 18, which contains a normally open electrical contact is caused to close its contact, which prepares the electrical circuit for its next cycle.

Figure 3:
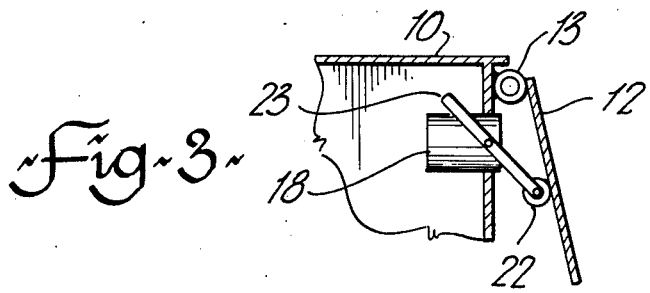
FIG. 3 is a side view detail of a micro-switch used in the ramp of FIG. 2.

FIG. 3 depicts microswitch 18 as a detail in side elevation. Lip 12 is shown pivoted about hinge 13, which is fastened (by means not shown) to platform 10. A roller 22, which rotates about an axis at the end of arm 23, bears against the underside of lip 12. When lip 12 approaches its closed position, it makes contact with roller 22, rotating arm 23 about its axis, operating microswitch mechanism 18. Microswitch 18 is normally open, but closes upon actuation of lip 12. Arm 23 passes through an aperture in the flange of platform 10 extending downwardly, microswitch 18 being fastened thereto.

It should be noted that FIG. 3 is distorted in certain respects since the operating mechanism including post 17 is not shown. The post may be located either above or below microswitch 18, depending on the dimensions and desired angle of operation of the microswitch arm 23 which is chosen for the particular design.

Figure 4:
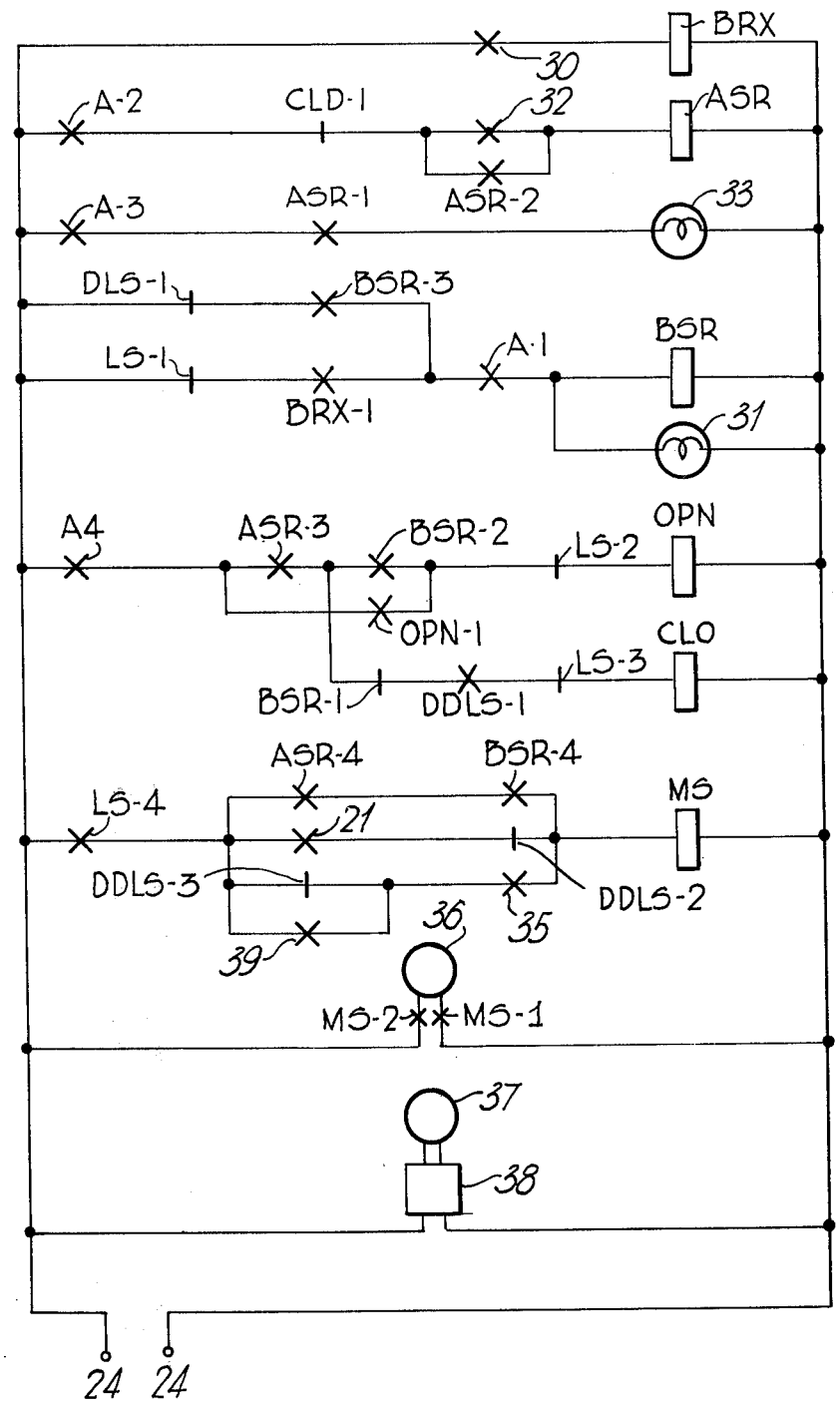
FIG. 4 is a schematic diagram of the circuitry used in the present invention.

FIG. 4 is a schematic diagram of the electrical portion of the invention. The circuit can typically be operated on 117 volts, 60 cycles, which is applied to terminals 24, although other power sources could be used for a particular requirement.

Figure 5:
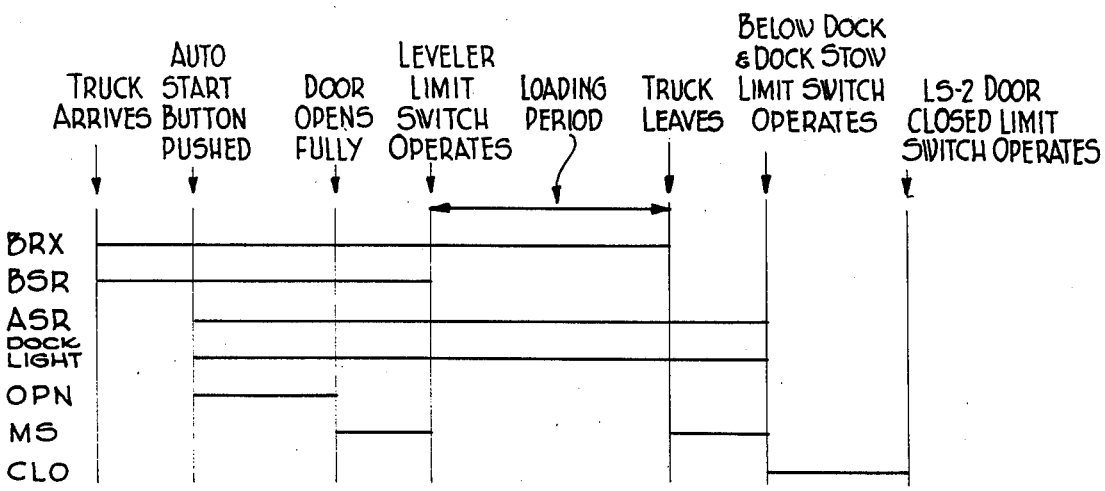
FIG. 5 is a timing diagram of the parts shown in FIG. 4.

Looking at both FIGS. 4 and 5 in conjunction, a truck arrives and closes the make contacts of bump switch 30. Bump switch 30 is in series with relay coil (henceforth referred to simply as "relay") BRX, the two being connected in series across power terminals 24. Relay BRX thus operates.

It may be desired to operate the BRX relay from a lower voltage supply, such as 24 volts, since the contacts 30 are exposed, usually out-of-doors. An alternative circuit therefore would be to connect the series of contact 30 and relay BRX across the secondary of a 24 volt transformer, the primary being connected across power terminals 24. Other alternatives could be a pressure sensitive switch in the road upon which the truck is to stop, a photo cell upon which is displayed a light beam which is interrupted by the truck in its loading position, etc.

A BSR relay is connected across power terminals 24, in series with makes contact BRX-1, and break contact LS-1. Make contact A-1 which is also in series will be disregarded for the moment, and it will be assumed that a complete circuit passes therethrough. Break LS-1 is a limit switch disposed in a location which will open-circuit when the door 4 has opened fully. At the present moment, however, the door is not open fully, and with the closing of make contact BRX-1, the BSR relay operates.

Connected in parallel with relay BSR is arrival indication light 32, which can simply be a light bulb, or alternatively a light with a flasher, or have a buzzer connected in parallel, etc.

Connected in parallel with contact LS-1 and BRX-1 are the series circuit of make contact BSR-3 of the BSR relay, and the dock up limit switch DLS-1, which opens when the ramp is at its maximally raised position.

Also connected across the power terminals 24 is the ASR relay, in series with its open make contact ASR-2, break contact CLO-1 of a CLO relay, and make contact A2, which will be considered as a short circuit for the time being. In parallel with the ASR-2 contact is a start contact 32, preferably provided as a push-button switch manually operated by an operator.

Dock light 33 is connected across the power terminals 24 through the make contact ASR-1, and make contact A-3. The latter contact will be considered as a short circuit for the moment. It will be seen, therefore, that when the ASR relay is operated, the dock light 33 will be illuminated.

An OPN relay is connected across the power terminals 24 through the break contacts of a limit switch LS-2, which, along with contact LS-1, open circuits when the door 4 is fully opened. The circuit is also connected through make contacts BSR-2 and ASR-3, as well as through make contact A-4, which will be considered as a short circuit for the time being. Shunting contacts BSR-2 and ASR-3 is make contact OPN-1.

A CLO relay, referred to earlier, is connected to the junction of contacts BSR-2 and ASR-3 through BSR-1 break contact, a break contact LS-3, which is a limit switch which opens when the door is fully closed, and make contact DDLS-1, which is a limit switch which is closed when the automatic levelling dock is in its cross-traffic, stowed, position.

Also connected across the power terminals 24 is an MS relay. The operation path of the MS relay passes through make contacts BSR-4 and ASR-4, and in series with the make contact LS-3, which is closed when the door 4 is fully open (while limit switches LS-1 and LS-2 are open circuited when the door is open).

In parallel with contacts ASR-4 and BSR-4 is the make contact of travel switch 21, in series with the break contacts of limit switch DDLS-2, which open when the automatic levelling ramp is in its stowed, cross-traffic position.

In parallel also with contacts ASR-4 and BSR-4 is the series connection of break contact DDLS-3, which is a limit switch which opens when the ramp is in its cross-traffic position, and as well as the make contacts of the manually-operated "operate" switch 35. In parallel with contact DDLS-3 is the make contact 36 of lip switch 18 described earlier with reference to FIGS. 2 and 3. This switch is closed when the lip is in its stowed position, and unextended.

The ramp motor 36 is connected across power terminals 24 through make contacts MS-1 and MS-2, and hence is operating when the MS relay operates. The door motor 37 is operated through reversing contacts 38, which are operated in a well-known manner by the OPN and CLO relays. The OPN relay operates motor 37 in its forward direction to open the door, while the contacts of relay CLO operate motor 37 to close the door. This can be performed by the use of a reversing DC motor, or through the operation of a solenoid-actuated reversing clutch, operated by the aforenoted OPN and CLO contacts.

The circuit operates as follows. As noted earlier, when a truck backs into position, the BRX relay operates. The BSR relay is thus immediately operated, as is the arrival indication light 31.

Upon being signaled by light 31, an operator will push a button, closing contacts 32. This causes the ASR relay to operate, which closes a circuit to the dock light 33. In addition, a circuit is completed to the OPN relay, which also operates.

With the OPN relay operated, the door motor 37 is caused to power-open the door 4 to the building, thus providing access from the building to the now-illuminated interior of the truck.

Once the door has fully opened, the limit switches LS-1, LS-2, and LS-4 are operated. This removes power from one of the operation paths of the BSR relay, although power is also supplied in parallel through the DLS-1 and BSR-3 contacts. Power is also removed from the OPN relay to the opening of the LS-2 contacts.

With the LS-4 limit switch contact closed, power is applied to the MS relay through the ASR-4 and BSR-4 contacts. The MS relay closes contacts MS-1 and MS-2 in the operation path of the ramp motor 36, power having been removed from the door motor 37 by the opening of the circuit path through relay OPN.

With the operation of ramp motor 36, hydraulic pressure is applied and the piston 14 described in FIG. 2 is caused to extend, raising platform 10.

Once the hydraulic cylinder 14 has extended, the hydraulic cylinder 16 is caused to operate, extending lip 12 over the end of the bed of truck 8. The ramp limit switch DLS-1 is thus caused to open, opening the last current path to the BSR relay and arrival indication light 31, causing the latter to turn off. With the BSR relay having no power, the current path through the ASR-4 and BSR-4 contacts to the MS relay is opened, removing power from the MS relay. Toggle switch 21 is open at this point, and hence there is no current path through to the MS relay. The ramp motor having stopped, the ramp gradually settles down with the lip extending over the bed of the truck. Goods may now be carried over the ramp to the illuminated interior of the truck.

When loading or unloading of the truck is completed, it may be simply driven away. The ramp drops, cushioned by fluid flow out of hydraulic cylinder 14. When the ramp has dropped low enough, toggle 21 operates, closing a current path through the DDLS-2 break contact to the MS relay, which operates, closing contact MS-1 and MS-2. Power is applied to ramp motor 36, causing the platform and lip to become extended, whereupon the toggle will open, removing power from motor 36 and hydraulic power from both cylinders 14 and 16, whereupon the lip will turn to its closed position and the platform will drop. The levelling ramp is thus returned to its cross-traffic position.

However, upon returning, the below dock limit switches DDLS-1, DDLS-2, and DDLS-3 operate. The DDLS-1 switch closing, applies power to the CLO relay through closed limit switch LS-3 and normally closed contacts BSR-1, as well as operated make contacts ASR-3. The CLO relay operating will apply closing power to motor 36, which closes the door 4. The CLO relay operating also opens contact CLO-1 in the conduction path of the ASR relay, causing it to disconnect. The ASR-1 contact thus opens, turning off the dock light 33.

When the door closes, limit switch LS-3 operates, cutting off power to the CLO relay, which, in turn, turns off power to the door motor 37.

The entire circuit has thus returned to normal rest position.

It is also desirable to operate the door and ramp manually. This function has been provided, with the safeguard that the automatic levelling ramp cannot be raised while the door is closed, nor can the door be closed while the ramp is extended.

To facilitate the above, contacts A-1, A-2, A-3, and A-4 are provided in the locations noted, the operation path for the BSR, ASR, and OPN relays as well as the dock light 33. These contacts are in an "automatic-manual" switch, which contacts are closed during the automatic function of the circuit. For manual operation, the switch is opened. A bypass circuit to the junction of the BSR-2 and LS-2 contacts is provided with a manual switch (not shown) to operate the OPN relay which causes the door to open. Similarly, a bypass switch to the junction of the BSR-1 and DDLS-1 contacts to operate the CLO relay in order to close the door manually.

In order to operate the ramp, manual switch 35 is operated, which applies current to the MS relay, which raises or drops the levelling ramp to the appropriate height. Since power is applied through the DDLS-3 contact, if the door is not open, current will not be conducted therethrough.

In addition, a lip switch 39 is provided in parallel with contact DDLS-3, which provides power through manual switch 35 when the below dock limit switch DDLS-3 is operated, in the even the levelling ramp has been operated in a way which extends the lip only slightly upwardly, with the ramp sloping downwardly.

Clearly, numerous small modifications and additional units can be added to the present invention by someone skilled in the art understanding it. For instance, a dock shelter can be placed around the door, the shield the rear of the truck and the entrance to the shipping room from the elements. In the event that the shelter is of the motor driven accordion-expanding type, the operation thereof can be actuated by an OPN contact, or in parallel with the opening of the door. Similarly, it can retract to its stored position which the closing of the door.

Instead of the BRX relay simply lighting up the arrival indication light 31, a BRX contact can be located in place of contact 32, causing the entire opening and closing procedure to be automatically activated by the operation of switch 30 by a truck.

Numerous additional modifications may now come to be evident to one skilled in the art. However such are considered to be part of this invention and are intended to be included in the scope of the appended claims.

We claim:

1. A loading dock assembly adapted to be included in a building comprising:
   a. a door for closing a loading opening in the building, above said dock,
   b. automatic dock leveller means for providing a ramp bridging the bed of a truck and the dock, and
   c. automatic control means for opening or closing the door and raising or lowering said dock leveller means,
   d. said control means being arranged to open the door only when the truck bed is in a loading position and to raise the dock leveller upon the door being opened.

2. A loading dock assembly as defined in claim 1, in which the control means is adapted to first return the dock leveller means to its rest position, and then to close the door, upon the truck bed having moved away from the loading position.

3. A loading dock as defined in claim 2, further including means for switching on a dock light upon the door opening, and switching off the dock light upon the door closing.

4. A loading dock as defined in claim 2, including means for automatically starting operation of the control means upon the truck bed being moved to its loading position.

5. A loading dock as defined in claim 2, including signalling means for signalling into the building upon the truck bed being moved to its loading position, whereupon the control means can be manually started.

6. A loading dock as defined in claim 5, in which the signalling means is comprised of a bump switch against which the truck presses in its loading position.

7. A loading dock as defined in claim 5, further including means for manually controlling the opening of the door and raising of the dock leveller means.

8. A loading dock as defined in claim 7, further including:
   a. a first relay operated through said bump switch,
   b. a second relay, operated through a first brake contact on the first relay in series with a "door open" break contact limit switch which has an operation circuit in series with a first make contact on the second relay in series with a "dock up" break contact limit switch,
   c. a third relay, a fourth relay, and a fifth relay, the third relay being operated through a first break contact on the fifth relay and a first make contact on the third relay which is in parallel with a manually operated "start sequence" make contact; the fourth relay being operated through a "door open" break contact limit switch and a first make contact on the fourth relay which is in parallel with a second make contact on the second relay in series with a second contact on the third relay, the second make contact on the second relay being connected to the first contact on the fourth relay; the fifth relay being operated through a "door closed" break contact limit switch, a "door stowed" make contact limit switch and a third break contact on the second relay, in series between the fifth relay and the junction of the second contact on the third relay and the second make contacts on the second relay in the operation path of the fourth relay, and
   d. a door opening and closing motor, a pair of contacts on the fourth relay being connected thereto for operating the motor for opening the door and a pair of contacts on the fifth relay being connected thereto for operating the motor for closing the door.

9. A loading dock as defined in claim 6, further including a sixth relay and a dock motor adapted to raise or lower the door, a pair of make contacts on the sixth relay in the operation path of the dock motor, the operation path of the sixth relay having a make contact door open limit switch in series with a third make contact on the third relay and fourth make contact on the second relay and a make contact dock return tumbler switch, closed in the dock lowered position, and in the series with a below dock break contact limit switch, closed in the dock lowered position, the series of tumbler and below dock switches being in parallel with the series of third contacts on the third relay and fourth contacts on the second relay.

10. A loading as defined in claim 9, including a dock light, and a fourth make contact on the third relay in series with an operation circuit path thereof.

11. A loading dock as defined in claim 10, including switch means for cutting off current flow into the operation paths of the third, second, fourth and fifth relays and the dock light through said contacts for manual operation of the door motor and dock motor.

* * * * *

UNITED STATES PATENT OFFICE
CERTIFICATE OF CORRECTION

Patent No. 4,010,571  Dated March 8, 1977

Inventor(s) Winston B. McGuire et al.

It is certified that error appears in the above-identified patent and that said Letters Patent are hereby corrected as shown below:

Column 2, line 28, "202" should read -- 2 --.

Column 2, line 29, delete "1(b)," and insert -- of --.

Column 6, line 67, "the", second occurrence, should read -- to --

Signed and Sealed this twenty-sixth Day of July 1977

[SEAL]

Attest:

RUTH C. MASON
*Attesting Officer*

C. MARSHALL DANN
*Commissioner of Patents and Trademarks*